(12) United States Patent
Kacker et al.

(10) Patent No.: US 7,391,528 B2
(45) Date of Patent: Jun. 24, 2008

(54) APPARATUS AND METHOD FOR HIGH-THROUGHPUT AND FLEXIBLE DIGITAL PRINTING

(75) Inventors: Dhiraj Kacker, Burlingame, CA (US); Russ Ennio Muzzolini, San Carlos, CA (US)

(73) Assignee: Shutterfly, Inc., Redwood City, CA (US)

( * ) Notice: Subject to any disclaimer, the term of this patent is extended or adjusted under 35 U.S.C. 154(b) by 999 days.

(21) Appl. No.: 10/446,375

(22) Filed: May 28, 2003

(65) Prior Publication Data

US 2004/0252327 A1    Dec. 16, 2004

(51) Int. Cl.
*B41B 27/00* (2006.01)

(52) U.S. Cl. ............... 358/1.15; 358/1.14; 358/1.13; 709/239; 709/240; 718/104; 718/106

(58) Field of Classification Search ............... 358/1.15, 358/1.14, 1.13; 709/239, 240; 718/104, 718/106

See application file for complete search history.

(56) References Cited

U.S. PATENT DOCUMENTS

| | | | |
|---|---|---|---|
| 4,918,490 A | 4/1990 | Stemmle | |
| 5,519,499 A | 5/1996 | Saito | |
| 5,533,175 A | 7/1996 | Lung et al. | |
| 5,615,015 A | 3/1997 | Krist et al. | |
| 5,740,497 A | 4/1998 | Yamada et al. | |
| 5,907,410 A | 5/1999 | Ohtake | |
| 5,982,994 A | 11/1999 | Mori et al. | |
| 6,025,923 A * | 2/2000 | Kageyama et al. | 358/1.14 |
| 6,038,033 A | 3/2000 | Bender et al. | |
| 6,091,506 A * | 7/2000 | Payne et al. | 358/1.14 |
| 6,157,436 A * | 12/2000 | Cok | 355/40 |
| 6,327,050 B1 | 12/2001 | Motamed et al. | |
| 6,373,585 B1 * | 4/2002 | Mastie et al. | 358/1.15 |
| 6,384,934 B1 | 5/2002 | Kohtani et al. | |
| 6,816,276 B2 * | 11/2004 | Sugano | 358/1.15 |
| 7,084,997 B2 * | 8/2006 | Clough | 358/1.15 |
| 7,148,985 B2 * | 12/2006 | Christodoulou et al. | 358/1.15 |
| 2002/0034392 A1 | 3/2002 | Baum et al. | 396/564 |
| 2003/0101304 A1 * | 5/2003 | King et al. | 710/301 |
| 2003/0193683 A1 * | 10/2003 | Motamed et al. | 358/1.13 |
| 2003/0214660 A1 * | 11/2003 | Plass et al. | 358/1.9 |
| 2004/0114170 A1 * | 6/2004 | Christiansen et al. | 358/1.13 |

* cited by examiner

*Primary Examiner*—Twyler L. Haskins
*Assistant Examiner*—Jacky X. Zheng
(74) *Attorney, Agent, or Firm*—Xin Wen

(57) ABSTRACT

A digital printing system for producing prints in response to input digital images includes a digital printer and a plurality of computer processors. The plurality of computer processors includes one or more image-rendering units for rendering the input digital images to generate rendered digital images, wherein the image rendering is independent of specific characteristics of the digital printer. The plurality of computer processors further includes one or more image processors for processing the rendered digital images in accordance with one or more specific characteristics of the digital printer. The processed images are subsequently input to the digital printer to produce the prints. The computer processors can be dynamically assigned to be the image-rendering units or the image processors.

10 Claims, 4 Drawing Sheets

APPARATUS AND METHOD FOR HIGH-THROUGHPUT AND FLEXIBLE DIGITAL PRINTING

CROSS-REFERENCES TO RELATED INVENTIONS

The present invention is related to commonly assigned U.S. patent application Ser. No. 09/436,704, filed on Nov. 9, 1999, titled "Distributing Images to Multiple Recipients", U.S. patent application Ser. No. 09/450,075, filed on Oct. 27, 1999, titled "Printing Images in an Optimized Manner", U.S. patent application Ser. No. 09/871,022, filed on May 31, 2000, titled "Apparatus, Architecture, and Method for High Speed Printing". The disclosures of these related applications are incorporated herein by reference.

FIELD OF THE INVENTION

This invention relates to the field of digital printing, and more specifically to an apparatus, architecture and method for efficient printing image prints using digital image data.

BACKGROUND OF THE INVENTION

For many years, photographs were produced in an analog process based on silver-halide chemistry. An image was captured by exposing a photo-sensitive film to a scene by an optical system in a camera. The photo-sensitive material coated on the film include silver halide emulsions. The silver halide emulsions can capture photons and record a latent image corresponding to the captured image. The exposed photo-sensitive film was chemically developed to convert the latent image into a dye image on the film. A photo-sensitive paper was in turn exposed to the dye image on the film. A photographic print is finally obtained after the exposed paper is processed. As with other systems, photography can benefit from digital techniques applied to various aspects of the process. Image data, captured by a digital camera or digitized from a reflective print or a film by a scanner, can be transmitted anywhere in the world almost instantaneously and then stored on mass storage devices. Multiple copies can be easily made and stored at different locations. The image data can be manipulated using image-processing software.

As well known in the photographic industry, it is desirable for the photographic prints to have the look and feel of the conventional silver halide based photographic prints, even if the images are captured in a digital process. To fulfill this need, the digital images can be digitally exposed on a photographic paper and subsequently developed, bleach/fixed, and washed in the conventional photographic chemical processes. Such produced photographic prints have equal image quality and the same look and feel as the conventional photographs for viewing and sharing.

The process for generating photographic prints includes a number of different steps. Image data are often compressed in the digital cameras. To generate a print of such compressed images, one must uncompress the data and perform image processing on the uncompressed image data. The image processing operations can include tone or color adjustment, neutral balance, and image enhancement. Additional image design and text information may also be added to the digital image. Digital prints based on the digital images can be produced using a variety of digital printing technologies such as digital silver halide, ink jet, thermal dye sublimation, and electrophotography. In the example of the digital silver halide printing, the image data is converted into an image exposure pattern to expose a photosensitive material coated on a substrate to form a latent image. The latent image is converted to form a dye image when the photosensitive material is processed. Information may be printed on the back of the prints. The prints are cut and packaged before shipping. Any of these processes can become a bottleneck that limits the overall speed of the system.

Thus, there is a need for a method and apparatus that can efficiently reproduce photographic prints in response to input digital images.

SUMMARY OF THE INVENTION

One aspect of the present invention provides a digital printing system for producing prints in response to input digital images, comprising:
  a) a digital printer for producing prints;
  b) a plurality of computer processors, including
    i) one or more image-rendering units for rendering the input digital images to generate rendered digital images, wherein the image rendering is independent of specific characteristics of the digital printer; and
    ii) one or more image processors for processing the rendered digital images in accordance with one or more specific characteristics of the digital printer, such processed images being subsequently used by the digital printer to produce the prints, wherein the plurality of computer processors can be dynamically assigned to be the image-rendering unit or the image processor.

Another aspect of the present invention provides a method for a digital printing system for producing prints in response to input digital images, comprising:
  a) a plurality of digital printers that are distributed at two or more locations;
  b) a plurality of computer processors, including
    i) one or more image-rendering units for rendering the input digital images to generate rendered digital images, wherein the image rendering is independent of specific characteristics of the digital printer; and
    ii) one or more image processors for processing the rendered digital images in accordance with one or more specific characteristics of the digital printer, such processed images being subsequently used by the digital printer to produce the prints, wherein the plurality of computer processors can be dynamically assigned to be the image-rendering unit or the image processor.

An advantage of the present invention is that it provides a high-throughput digital printing system that can fully utilize the maximum intrinsic speeds of the digital printers within the digital printing system. The digital images are first rendered independent of the printer devices and subsequently processed specific to the printer devices so that the digital images are prepared to be in the ready-to-print states prior to the printing operations. The workflow is setup to adapt the images to the color reproduction state of the final output device so that the same original image reproduced on different machines, possibly at remote locations, all produce almost the same colors.

Other advantages of the present invention include the following. The architecture of the rendering system is compatible with low-cost off-the-shelf computers, resulting in high price/performance computing. It is flexible, robust, and scalable to any printing throughputs and printer types. Furthermore, the present invention provides a flexible digital printing system that is suitable for the centralized and distributed printing. The distributions of the image rendering system can be tailored to the distributions of the digital printers, the data transmission rates, and the schedules of the various operations related to digital printing. The system throughput is optimized by the flexibility of dynamic assignments of image rendering, image processing, the printing jobs to distributed computer processors and digital printers.

Still another advantage of the present invention is that it provides an efficient digital printing system that includes a image rendering system that can dynamically adjust processing resources in response to the number of digital images assigned to be rendered independent of the printer devices and the number of digital images assigned to be processed specific to the printer devices.

Another advantage of the present invention is that it allows for quickly adding to capacity and adapting to changes in demand by utilizing excess capacity on printers in remote locations, possibly owned and operated by a diverse group of companies and operators. The invention standardizes key printing operations across a wide range of production workflows thus permitting the consolidation and utilization of resources that were heretofore not integrated.

BRIEF DESCRIPTION OF THE DRAWINGS

FIG. 1b is a block diagram showing details of the rendering system 120 of FIG. 1a.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1A:
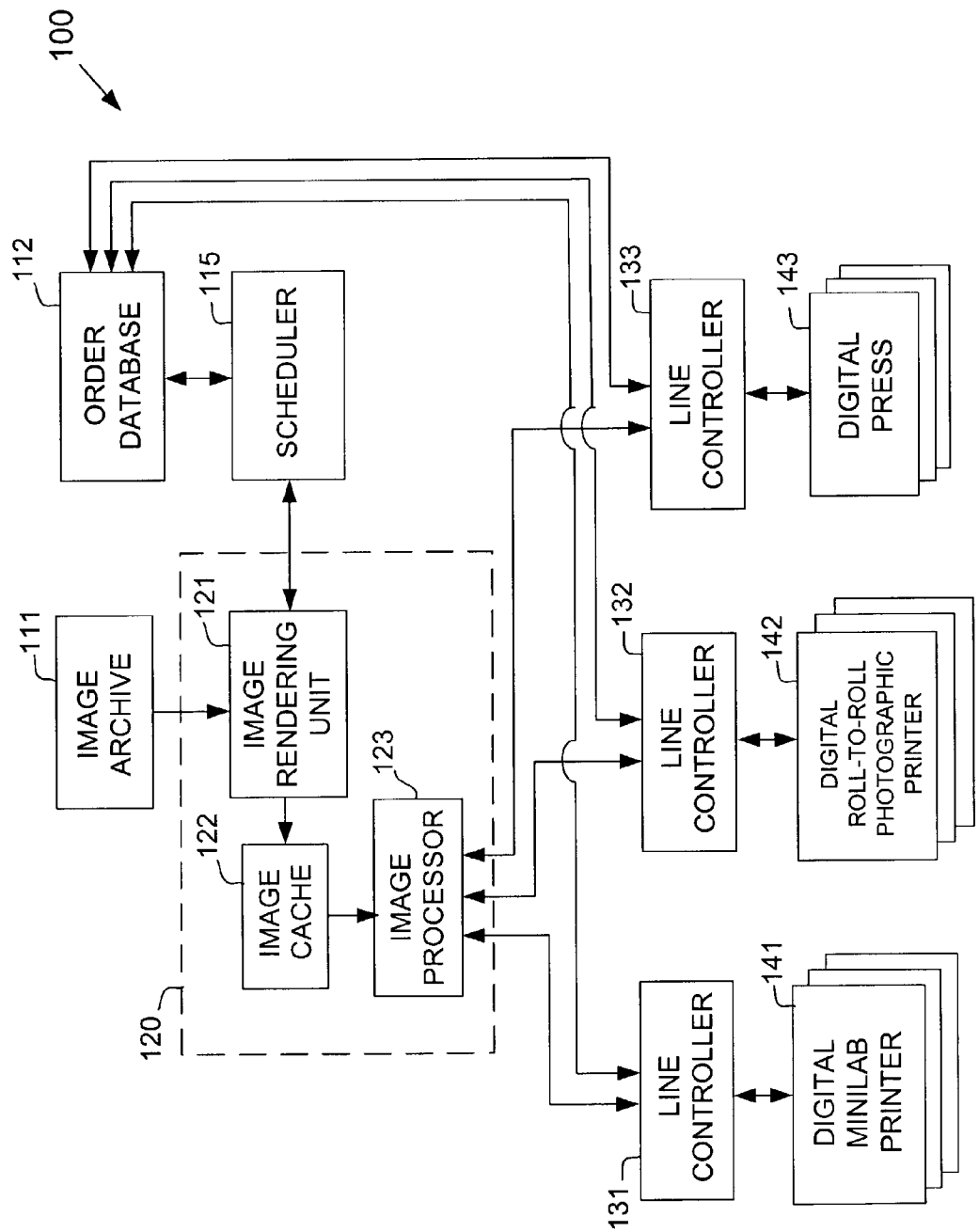
FIG. 1a shows a block diagram in accordance to one embodiment of the printing system of the present invention.

FIG. 1a shows an embodiment of the present invention. The digital printing system 100 includes an image archive 111 where the digital images are stored in the long-term base. The digital images can be captured by digital cameras by customers and sent to a photo service provider, such as Shutterfly, Inc, based at Redwood City, Calif., a retail location, or a business partner of the photo service provider. The digital images can also be digitized from photographic films after the images are captured on the film and the films are chemically processed. The customer can submit orders for producing image-based products using the digital images. In the present invention, image-based products include photographic prints, greeting cards, greeting cards, photo books and albums, poster images, framed photo prints, photo calendars, photo books, photo T-shirt, photo coffee mugs, CDs or DVDs containing recorded images, mouse pads, key-chains, or any other type of photo gift or photo novelty items. An order of image-based product may include a combination of different image-based products, for example, 4 copies of a 4"×6" prints based on one digital image, a personalized photo calendar based on 13 digital images (for the cover and the 12 months), and a photo birthday card base on another digital image. The order information submitted by the customers is stored in an order database 112. In addition, the rendering or processing status, the product types, the shipping methods and priorities of the print jobs are also stored at the order database 112.

The digital printing system 100 further includes a scheduler 115, an image rendering system 120, one or more digital printers such as one or more digital minilab printers 141, one or more digital roll-to-roll photographic printers 142, and one or more digital presses 143, and line controllers 131,132,133 respectively in connection with each digital printer (141,142, 143). The image rendering system 120 includes one or more image rendering units 121, an image cache 122, and one or more image processors 123. The digital printing system 100 can also include other types of digital printers such as thermal dye sublimation printers and electrographic (or laser) printers. Typically, it is desirable for a line controller to be located close to its associated digital printing equipment so it is easier for the operator to monitor the status of the printing jobs on the line controller. The various printing equipment and their associated line controllers can be distributed at one central location (i.e. at a central lab), or at one or more remote locations relative to the image archive 111, the order database 112, or the scheduler 115.

In the present invention, the term "photographic printer" refers a printer that receives digital images and produces dye images on a photosensitive material such as photographic paper. The digital minilab printer 141 described above is one type of the photographic printers. Examples of the digital minilab printers 141 compatible with the present invention include Fuji Frontier Digital Minilab printers, Noritsu's digital minilab printers, Kodak's Digital Lab System (DLS), Agfa D-Lab Minilab printers, and so on. Another type of photographic printers is the digital roll-to-roll photographic printers as exemplified by Gretag FastPrint printer, Kodak's I-Lab Central Lab printer, and Agfa's d-print.20 digital high-speed printer. These photographic printers typically include an exposure unit, one or more chemical processing unit, one or more back printing units, and one or more cutting and packaging units. The digital roll-to-roll photographic printers normally receive large rolls of unexposed photographic paper in light-sealed magazines. The paper rolls are cut at the cutting and packaging units after exposure, chemical processing, and backprinting. Details about the digital roll-to-roll photographic printers are disclosed in the commonly assigned and above referenced U.S. patent application Ser. No. 09/871, 022, filed on May 31, 2000, titled "Apparatus, Architecture, and Method for High Speed Printing", the disclosure of which is incorporated herein by reference.

Digital presses are typically based on 4-color (Y,M,C,K) offset printing engines. In contrast to the photographic printers that develop dye images on pre-sensitized photograph media, the digital presses print images by transferring toners or inks on to substrates. Examples of the digital presses include HP Indigo 9100 digital printing press, Xerox's DocuColor printers, and NexPress 2100.

The information about orders by the customers is stored in the order database 112. The scheduler 115 retrieves the order information from the order database 113, and organizes the orders into printing jobs. The priorities of the printing jobs may depend on a number of factors as defined by a predetermined set of rules, such as, the time when the job order was received, the shipping method, and any special timelines when the products are to be used (e.g. holiday presents or greeting cards before the holidays). Each order may contain a plurality of printing jobs. For example, the order cited above may include three printing jobs: one having 4 4"×6" prints, another job having a personalized photo calendar, and a third job including a photo birthday card. The scheduler 115 then sends information about the printing jobs and their sequence to the image rendering system 120.

Figure 1B:
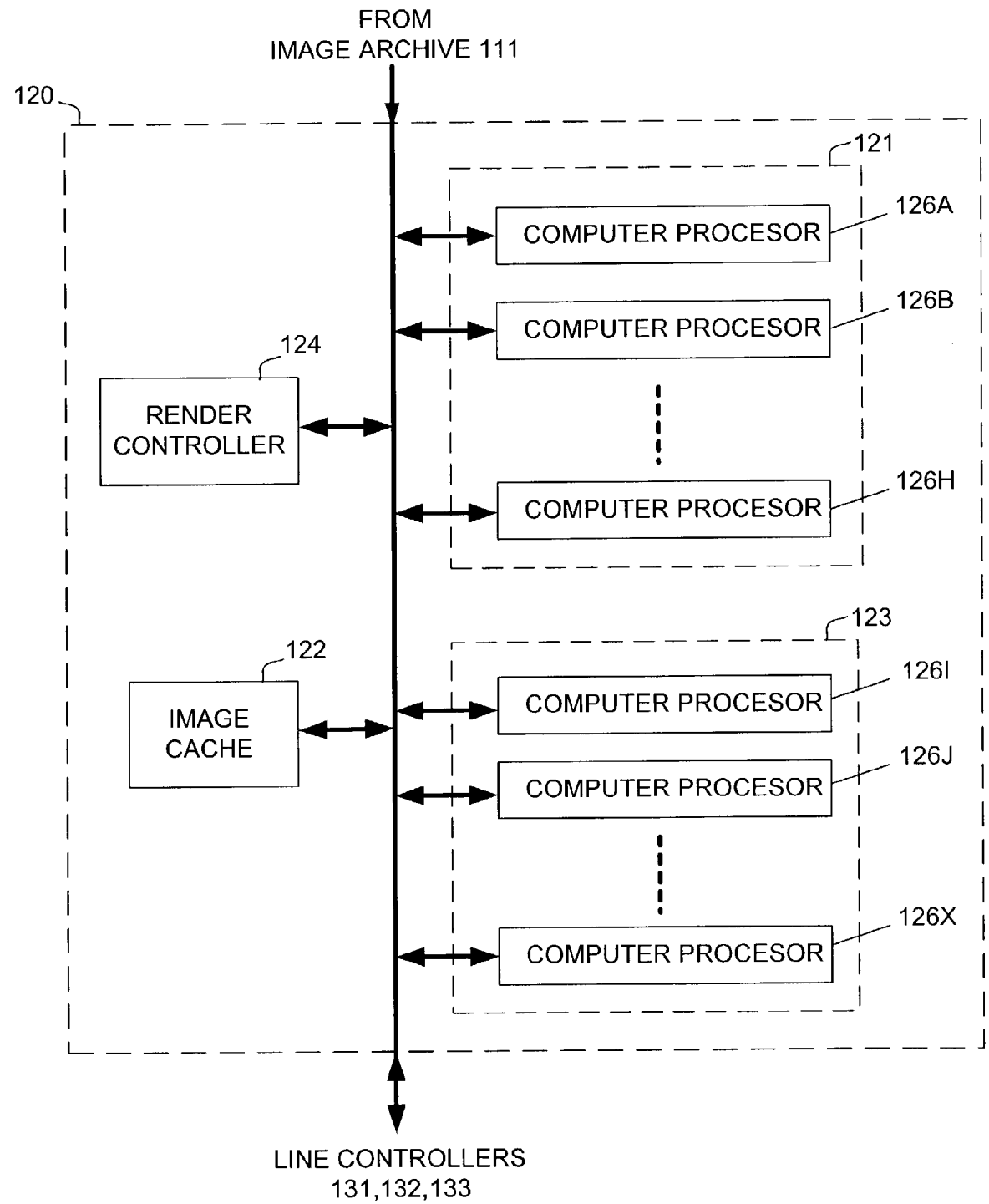

A detailed block diagram of the image rendering system 120 is shown in FIG. 1b. In one embodiment of the present invention, the image rendering system 120 includes a plurality of computer devices connected in a computer network such as a local area network (LAN) or the Internet. The image rendering system 120 includes a render controller 124, and an image cache 122, a plurality of computer processors 126A, 125B, . . . 126H,126I,126J,1 . . . and 126X that can be dynamically and automatically assigned to be the image rendering units 121 or the image processors 123. As described below, the render controller 124, the image cache 122 and the computer processors 126 can be distributed flexibly on the network for maximizing efficiency. In some embodiments, various devices in the image rendering system 120 uses a simple XML/URL based API (extended markup language/universal resource locator), and file based (NFS) and URL-based output. The architecture of the rendering system 120 can be built using low-cost off-the-shelf computers resulting in high price/performance computing. It is flexible, robust, and scalable to any printing throughputs and printer types of the digital printing system 100.

An advantage of the digital printing system 100 in the present invention is that it maximizes the overall throughput of the digital printing system 100. A key strength of digital images printing is that it can be customized in many ways that cannot be achieved by the traditional film-based photography. The digital image printing can be customized according to the image properties, the properties of the image capture devices, the image content, the specific users, the specific image-base products in the orders, and specific printing equipment used to produce the products. The increased demand on image customizations has greatly increased the loads of image rendering and image processing before the printing of the digital images. The image rendering and image processing operations are often the bottleneck to the digital printing system 100 if they are conducted in synchronization with the printing operations. The image-rendering system 120 allows image rendering and image processing to be performed prior to the printing operation so that ready-to-print image data is prepared before the printers begin the printing operations. The throughputs of the printers can therefore be fully utilized.

The processing of digital images includes printer-independent image rendering and printer-dependent image processing respectively handled by the image rendering units 121 or the image processors 123. The printer-independent image rendering includes image decompression, tone calibration, color correction, white balance, sharpening, image enhancement, image cropping, compositing image borders and/or image effects, and image re-sampling. The printer-independent rendering may also produce the images for the header prints for the printing jobs. The printer-dependent image processing includes color or tone calibrations of the printers, image re-sampling to prepare the image the printing resolutions, color mapping, image formatting, and optionally formatting print jobs for the printers, etc.

The image-rendering operations are printer independent and can be conducted before the printing jobs are assigned to specific printers. In accordance to the present invention, the image rendering operations begin at the image rendering units 121 once the printing job information is received from the scheduler 115. The rendered images are stored in the image cache 122. The status of the rendered images and printed jobs are updated at the order database 112. The image processing operations on the other hand are printer dependent, which are conducted after a printer has been assigned to print the printing jobs associated with the digital images.

The render controller 124 manages the image rendering system 120 to maximize its image rendering/processing efficiencies. The rendering controller 122 regularly records the requests for image rendering and image processing and determines the appropriate resources for each type of operations. For example, more computer processors (126A-H) will be automatically assigned to be the image-rendering units 121 than to be the image processors 123 if the number of scheduled image-rendering jobs is higher than the number of requested image-processing jobs. On the other hand, more computer processors (126I-X) are automatically assigned to be the image processors 123 than assigned to be the image-rendering units 121 if the number of requested image-processing jobs is higher than the number of scheduled image-rendering jobs.

Upon receiving the printing job information from the scheduler 115, the image rendering units 121 (i.e. the computer processors 126A,126B,126H that are assigned to be the image rendering unit 121) fetch from the image archive 111 all the digital images to be used by the printing jobs. The printer-independent image rendering is conducted. The rendered digital images are locally stored in the image cache 122 to minimize the delay in retrieving the images for the subsequent image processing. The status and the information of the rendered printing jobs are updated and stored at the order database 112. The information includes product types, shipping method, and priorities, etc.

Each of the line controllers 131-133 manages the printing jobs for the respective digital minilab printer 141, the digital roll-to-roll photographic printer 142, and digital press 143. When a printer is first turned on, its line controller (131, 132, or 133) sends an inquiry to the order database 112 for the status and the information of the rendered printing jobs stored in the image cache, including the information about orders of the product types that the printer is ready to print. In another embodiment of the present invention, the inquiries about the status and the information of the rendered printing jobs stored in the image cache can also be made by the line controllers to the schedule 215.

In yet another embodiment, the line controller can obtain order information from the scheduler, and the scheduler in turn talks to the order database. This has the advantage that a key single resource controls order assignment. Similar performance can be obtained when the line controller talks to the order database directly, by using the database to synchronize order assignment.

After the information of the rendered print jobs of the correct product types is received by the line controller, the line controller (131,132 or 133) sends a request to the image rendering system 120 (the render controller 124). The request to the image rendering system 120 specifies the product type that the printer is ready to print. For example, a digital minilab printer can at each time print one or two of the print formats such as 4"×6", 5"×7", 8"×10" and so on. A digital press may be able to print greeting cards, calendars, and so on.

The processing of the rendered digital images can be depend on the color-calibration characteristics of the digital printers. The printer-to-printer variability is proper compensated. As a result, a plurality of digital printers distributed at two or more locations can reproduce consistent color characteristics on receivers. The digital printers are typically calibrated at least once a day, can be more or less frequent depending on the color reproduction characteristics of the printing device. The calibration comes in two forms: 1. Calibration local to the printer; usually comes as part of the printer controller software from the manufacturer, and 2. External calibration, typically in the form of look-up-tables, ICC profiles, etc., that are stored in the image cache 122 in the image render system 120. The external calibration data can be created either by the Line Controllers, or by some external application that is the capability to print control patches on a given printer and create the appropriate look-up-tables and/or ICC profiles, or other forms of printer calibration. Other printer specific information such as printing resolution, orientation, the number of colors (RGB vs. YMCK) is also stored in the image cache 122.

After receiving the printing requests from the line controllers 131-133, the image render controller 124 searches the rendered images stored in the image cache 122 for appropriate product types as requested by the line controller. The rendered digital images of the product types that match the requested product type are sequenced in accordance to the priorities of the jobs/orders. A batch of these matched print jobs and the printer specific properties (e.g. calibration data) will be sent to the image processors 123 for the print-dependent image processing. The image processing of the rendered images are conducted on the image processor 126I,126J-126X. The processed and ready-to-print digital images are automatically sent to the line controller that made the request. The line controller stores a batch of printing jobs each containing one or more ready-to-print images specific to the printer. The printing operation is ready to begin. As the images are printed, the list of ready-to-print images may become shorter. The line controller (131-133) can send a new request to image render system when the number of ready-to-print images reaches a minimum threshold.

Figure 2:
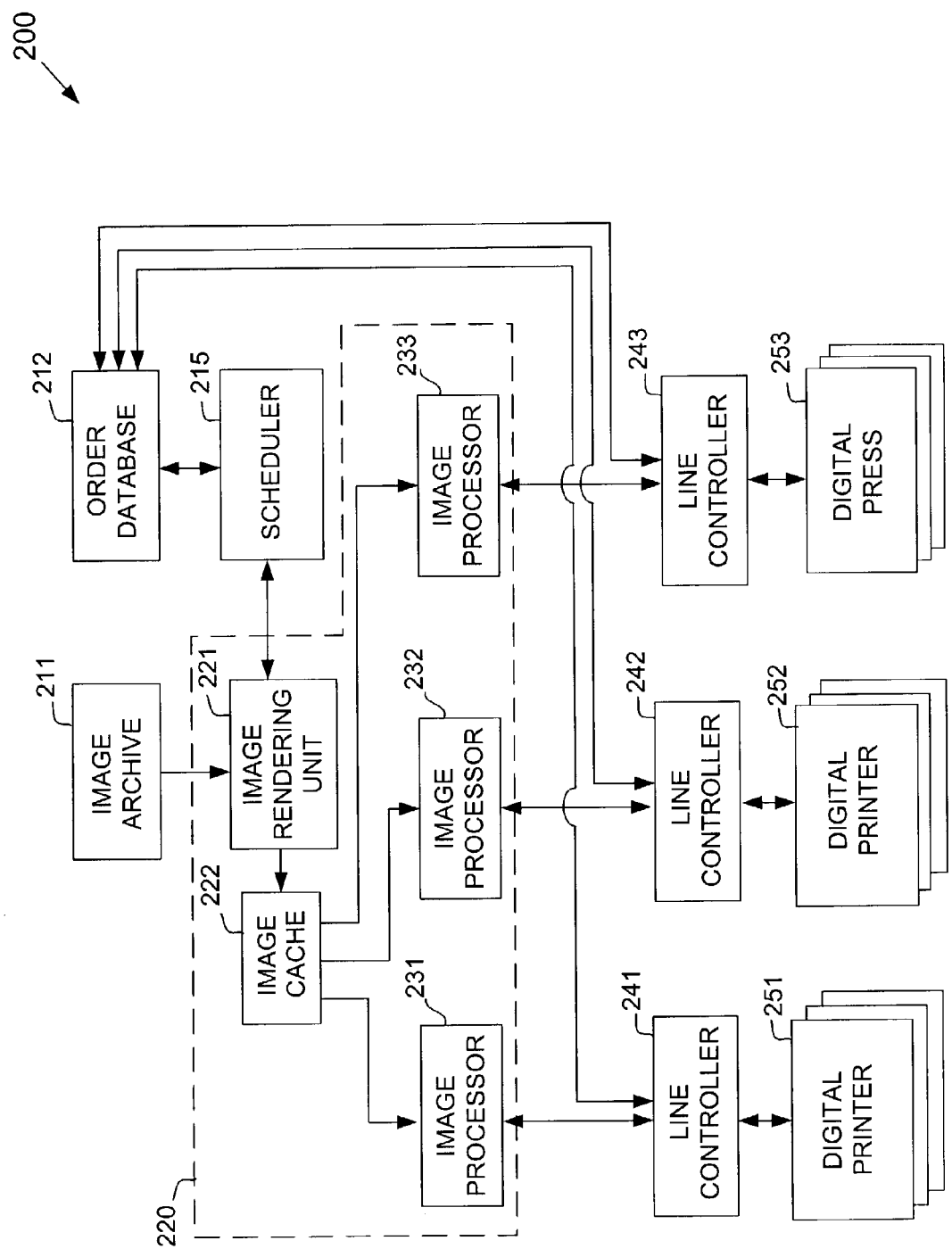
FIG. 2 is a block diagram in accordance to another embodiment of the printing system of the present invention.

The devices in the render system 120 can be distributed in different configurations. FIG. 2 illustrates another embodiment of the render system in accordance to the present invention. The printing equipment 251-253 are remotely located relative the image archive 211, the order database 212, and the scheduler 215. The printer-independent image rendering operations are conducted on the image- rendering unit 221 and stored on the image cache 222 after the printing jobs are prepared by the scheduler. The image processors 231-233 are distributed with each group of line controllers 241-243 and digital printing equipment 251-253. The printer-dependent image processing operations occur on the image processors next to the digital printing equipment 251-253. In other embodiments, the distribution of line controller, order database, image rendering, and scheduler resources can be appropriately distributed in remote or local facilities to optimize the utilization of all production capacity.

While the general sequence of the various pre-print operations are similar to those described above in relation to FIGS. 1a and 1b, the printing architecture in FIG. 2 is particularly optimal for the data transfer rate considerations. The processed digital images output of the image processor 231-233 are often in the raw image format and very large in image sizes (e.g. more than 6 MB for a 4"×6" print at 300 dpi printing resolution). These processed digital images may thus require considerable time for data transfer over the computer network, especially for transfers to remote locations where the digital printing equipment (251-253) are distributed. In contrast, the rendered digital images can be compressed (e.g. in JPEG format) and can be relatively small in image size (e.g. 0.5 MB per image). The architecture shown in FIG. 2 keeps the data transfer among remote locations to small image sizes. The data transfer of large image files sizes between the image processors 231-233 and the line controller 241-243 are conducted in a high-speed Location Area network (LAN) such as a GigaBit Ethernet and optical fiber connection. The high local data transfer rates assures that the data transfer to keep up with the printing rate of the printing equipment and that the data transfer does not become a bottleneck to the overall printing system 200.

The architecture in FIG. 2 is also compatible with data transfer over memory media between the central location (where the image rendering units are location) and the printer locations (where the digital printing equipment are located). Rather than storing on image cache 222, the rendered digital images can be stored on CD or DVDs and carried by an operator to the printer locations. The rendered images stored on the memory media will be processed and printed at the printer location. The communication to the order database is optional. This mode of operation can be beneficial when a network connection or a file transfer protocol is not established between the central location and the distributed locations like the situation between the photo service provider and a short-term printer partner.

Figure 3:
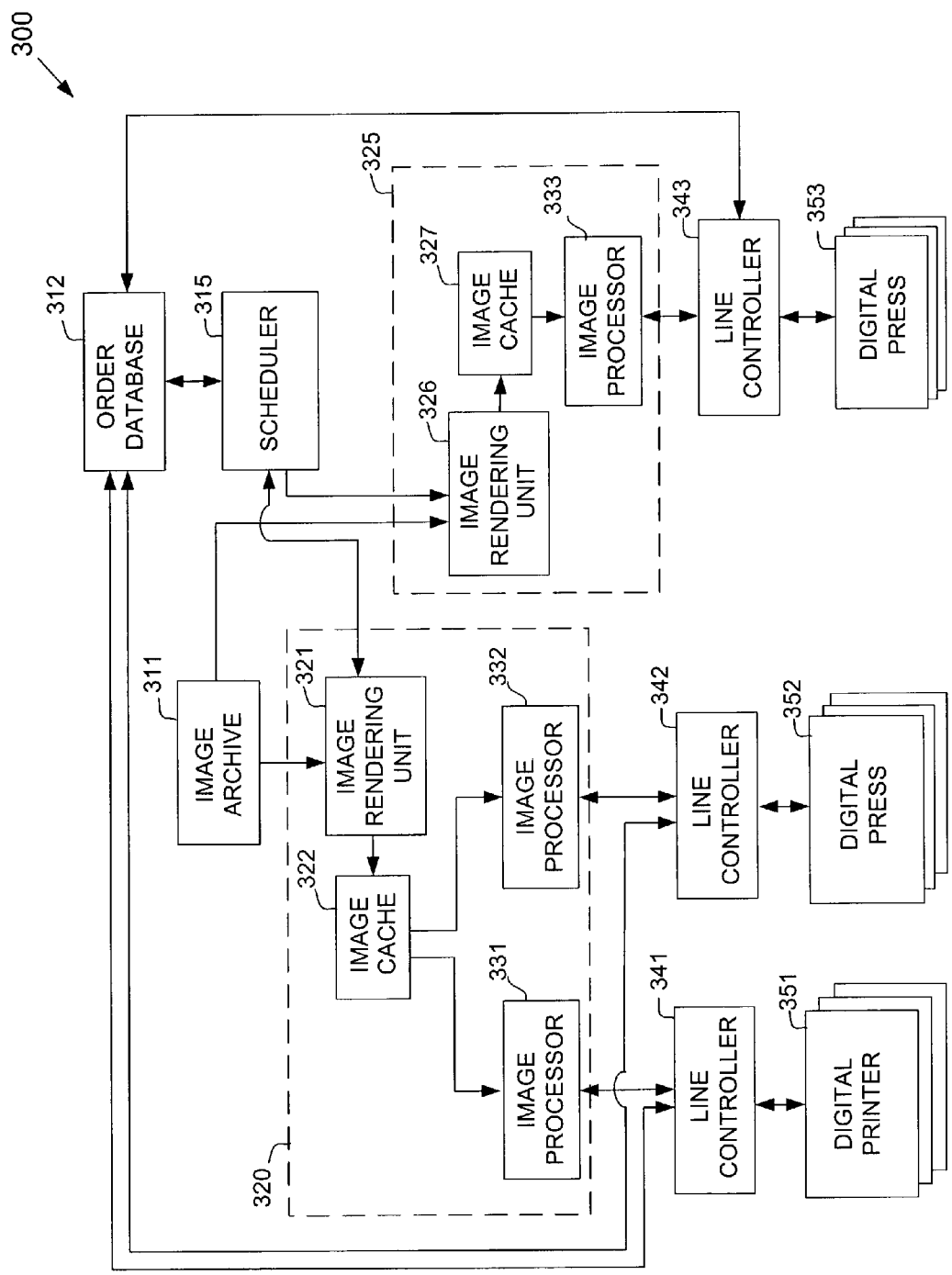
FIG. 3 is a block diagram in accordance to yet another embodiment of the printing system of the present invention.

FIG. 3 shows another embodiment of the image render system in accordance with the present invention. The printing system 300 includes a combination of centrally located printing equipment 351,352 and associated line controllers 341, 342, and distributed printing equipment 353 and line controller 343. The image rendering systems 320 and 325 can be tailored to suit the needs of both the centrally located and distributed printing equipment. The image render system 320 include centrally located image rendering unit 321 and image processors 331,332. The image rendering system 325 is completely remotely distributed next to the remote printing equipment 353. In one aspect, the architecture shown in FIG. 3 is a hybrid of the structures shown in FIGS. 1a and FIG. 2. The sequence of pre-print operations is also approximately the combination of the operations described in relations to FIG. 1a, FIG. 1b, and FIG. 2.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A digital printing system, comprising:
 a scheduler configured to schedule a print to be printed at a first site or a second site in response to an input digital image;
 a first digital printer located at a first site;
 a first image-rendering unit at the first site and in communication with the scheduler through a computer network, wherein the first image-rendering unit is configured to render the input digital image to generate a first rendered digital image without using a first printing resolution of the first digital printer;
 one or more first image processor at the first site, wherein the one or more first image processors are configured to process the first rendered digital image in accordance with the first printing resolution of the first digital printer and to produce a first processed digital image, wherein the first digital printer is configured to produce the print in response to the first processed digital image;
 a second digital printer located at a second site remote to the first site;
 a second image-rendering unit at the second site and in communication with the scheduler through the computer network, wherein the second image-rendering unit is configured to render the input digital image to generate a second rendered digital image without using a second printing resolution of the second digital printer; and a second image processor at the second site, wherein the second image processor is configured to process the second rendered digital image in accordance with the second printing resolution of the second digital printer and to produce a second processed digital image, wherein the second digital printer is configured to produce the print in response to the second processed digital image.

2. The digital printing system of claim 1, wherein the first rendering unit is configured to render the input digital image to generate the first rendered digital image without using color or tone calibration of the first digital printer.

3. The digital printing system of claim 1, wherein the one or more first image processors are configured to process the first rendered digital images in accordance with color or tone calibration of the first digital printer.

4. The digital printing system of claim 1, further comprising an image archive in communication with the first image rendering unit and the second image rendering unit, wherein the image archive is configured to store the input digital image.

5. The digital printing system of claim 1, further comprising a first image cache configured to store the first rendered digital images from the first image-rendering unit and to provide the first rendered digital images to the first image processor.

6. The digital printing system of claim 5, further comprising a second image cache configured to store the second rendered digital image from the second image-rendering unit and to provide the second rendered digital images to the second image processor.

7. The digital printing system of claim 1, wherein the first site is at a central location, wherein the second site is located remotely relative to the first site.

8. The digital printing system of claim 1, wherein the first image rendering unit renders the input digital image by conducting one or more of color and tone calibration, sharpening, white balance or adding a border pattern to the input digital image.

9. The digital printing system of claim 1, further comprising an order database in communication with the scheduler, wherein the order database is configured to store order information related to the input digital image.

10. The digital printing system of claim 1, wherein the first digital printer or the second printer is configured to produce a dye image, an ink image, or a toner image on a substrate.

* * * * *